United States Patent
Toda et al.

(10) Patent No.: US 12,254,520 B2
(45) Date of Patent: Mar. 18, 2025

(54) POWER MANAGEMENT SYSTEM AND POWER MANAGEMENT METHOD

(71) Applicant: KYOCERA CORPORATION, Kyoto (JP)

(72) Inventors: Kazuhide Toda, Kyoto (JP); Yasuhiro Nakamura, Kyoto (JP); Yusuke Kishina, Kyoto (JP); Noriyasu Kawakita, Kyoto (JP); Takashi Inoue, Kyoto (JP); Tomoya Shimomura, Kyoto (JP); Kenji Ikeuchi, Kyoto (JP); Hiroshi Yoshida, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/758,021

(22) PCT Filed: Dec. 25, 2020

(86) PCT No.: PCT/JP2020/048783
§ 371 (c)(1),
(2) Date: Jun. 26, 2022

(87) PCT Pub. No.: WO2021/132579
PCT Pub. Date: Jul. 1, 2021

(65) Prior Publication Data
US 2023/0029613 A1  Feb. 2, 2023

(30) Foreign Application Priority Data

Dec. 27, 2019 (JP) .................. 2019-238766

(51) Int. Cl.
*G06Q 50/06* (2024.01)
*H02J 3/00* (2006.01)
*H02J 3/38* (2006.01)

(52) U.S. Cl.
CPC ............ *G06Q 50/06* (2013.01); *H02J 3/0075* (2020.01); *H02J 3/381* (2013.01); *H02J 2300/24* (2020.01); *H02J 2300/30* (2020.01)

(58) Field of Classification Search
CPC ......... G06Q 50/06; H02J 3/0075; H02J 3/381
(Continued)

(56) References Cited

U.S. PATENT DOCUMENTS

| | | |
|---|---|---|
| 2012/0109705 A1 | 5/2012 | Belady et al. |
| 2014/0028254 A1* | 1/2014 | Shane ............... B60L 58/12 320/109 |
| 2016/0087909 A1 | 3/2016 | Chatterjee et al. |

FOREIGN PATENT DOCUMENTS

| | | | | |
|---|---|---|---|---|
| AU | 2008310901 A1 * | 4/2010 | ....... | G05B 19/41885 |
| CN | 103001225 A | 3/2013 | | |

(Continued)

OTHER PUBLICATIONS

Office Action in CN Application No. 202080089482.6 issued May 6, 2024, 36pp.

*Primary Examiner* — Akiba K Robinson
(74) *Attorney, Agent, or Firm* — HAUPTMAN HAM, LLP

(57) ABSTRACT

A power management system including a management apparatus configured to assign divided computation processing constituting at least a part of predetermined computation processing to a distributed computing device placed in a facility, wherein the management apparatus includes a receiver configured to receive a message including an information element indicating a type of a power source configured to identify electrical power allowed as electrical power to be used by the distributed computing device, and a controller configured to perform assignment processing to
(Continued)

assign the divided computation processing to the distributed computing device based on the type of the power source.

18 Claims, 14 Drawing Sheets

(58) Field of Classification Search
USPC .................................. 705/412, 63, 7.11, 1.1
See application file for complete search history.

(56) References Cited

FOREIGN PATENT DOCUMENTS

| | | | | |
|---|---|---|---|---|
| CN | 111127137 A | * | 5/2020 | |
| JP | 2011-002929 A | | 1/2011 | |
| JP | 6359716 B1 | * | 7/2018 | .............. G06F 11/30 |
| JP | 2019101797 A | | 6/2019 | |
| JP | 2019-165580 A | | 9/2019 | |

* cited by examiner

POWER MANAGEMENT SYSTEM AND POWER MANAGEMENT METHOD

RELATED APPLICATIONS

The present application is a National Phase of International Application Number PCT/JP2020/048783 filed Dec. 25, 2020 and claims priority to Japanese Application Number 2019-238766 filed Dec. 27, 2019.

TECHNICAL FIELD

The present disclosure relates to a power management system and a power management method.

BACKGROUND ART

In recent years, techniques for performing predetermined computation processing by using two or more distributed computing devices placed in two or more facilities (hereinafter, referred to as distributed processing techniques) have been proposed. For example, the predetermined computation processing may include mining processing of adding a transaction record of virtual currency to a transaction ledger, and may include rendering processing of generating an image from various image parameters.

Under such a background, a technique for determining pieces of computation processing to be assigned to distributed computing devices based on surplus power in facilities in which the distributed computing devices are placed has been proposed (for example, Patent Document 1).

In the above-described distributed processing technique, it is preferable to reflect the policy of each facility when the pieces of the computation processing are assigned to the distributed computing devices because the distributed computing devices are placed in respective facilities. Although various kinds of policy are conceivable as the policy of each facility, the above-described technique may not reflect such a policy, and there is a possibility that the pieces of the computation processing cannot be appropriately assigned to the distributed computing devices.

CITATION LIST

Patent Literature

Patent Document 1: JP 2019-101797 A

SUMMARY

A first aspect is a power management system including a management apparatus configured to assign divided computation processing constituting at least a part of predetermined computation processing to a distributed computing device placed in a facility, wherein the management apparatus includes a receiver configured to receive a message including an information element indicating a type of a power source configured to identify electrical power allowed as electrical power to be used by the distributed computing device, and a controller configured to perform assignment processing to assign the divided computation processing to the distributed computing device based on the type of the power source.

A second aspect is a power management method to be used in a power management system including a management apparatus configured to assign divided computation processing constituting at least a part of predetermined computation processing to a distributed computing device placed in a facility, and the power management method includes receiving, by the management apparatus, a message including an information element indicating a type of a power source configured to identify electrical power allowed as electrical power to be used by the distributed computing device, and performing, by the management apparatus, assignment processing to assign the divided computation processing to the distributed computing device based on the type of the power source.

DESCRIPTION OF EMBODIMENTS

Embodiments will be described below with reference to the accompanying drawings. Note that in the following description of the drawings, the same or similar components will be denoted by the same or similar reference signs. However, the drawings are schematic.

Embodiment

Power Management System

Figure 1:
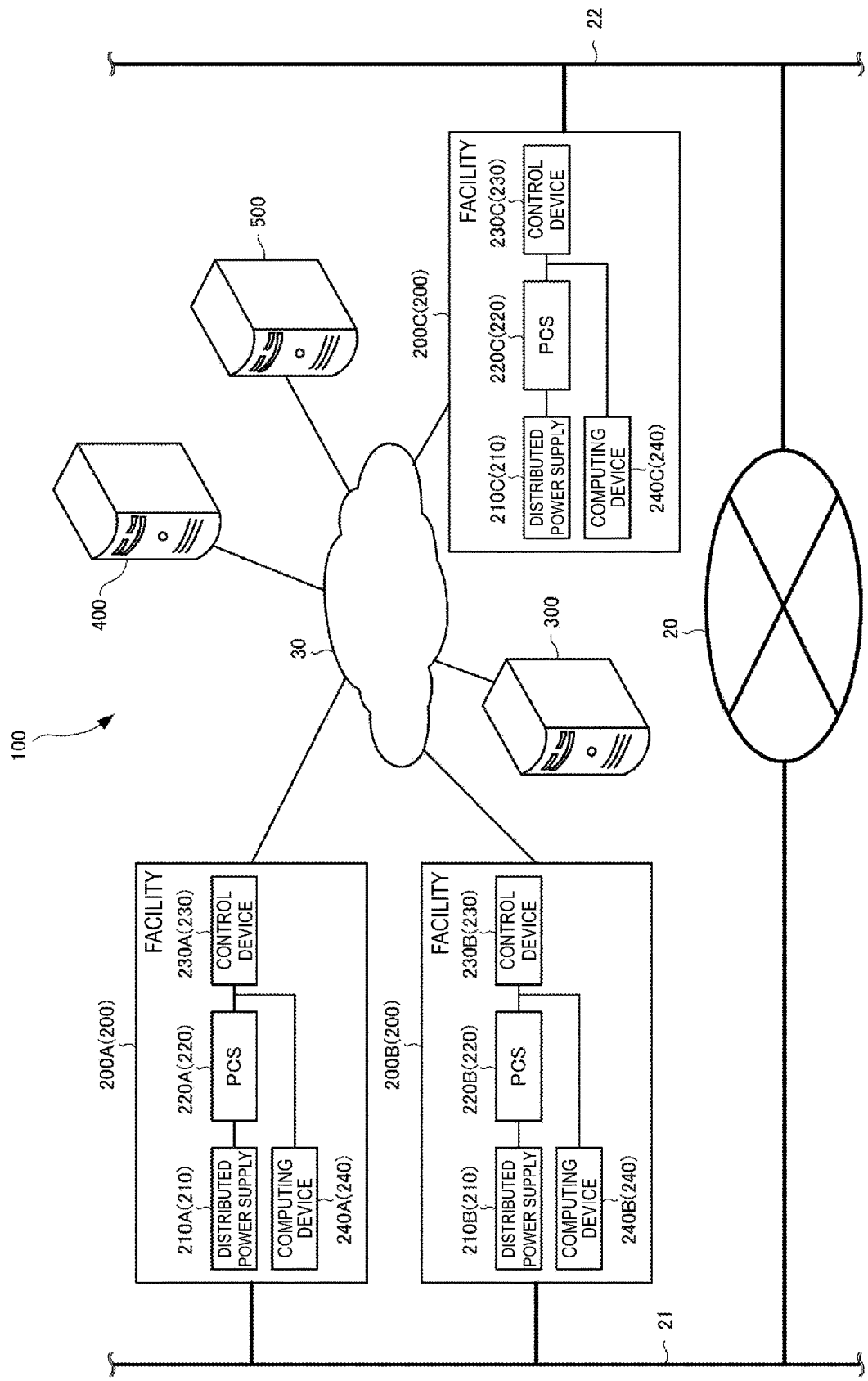
FIG. 1 is a diagram illustrating a power management system 100 according to an embodiment.

A power management system according to an embodiment will be described below. As illustrated in FIG. 1, a power management system 100 includes facilities 200, a power management apparatus 300, an assignment management apparatus 400, and a request server 500.

The facilities 200 are connected to each other through a bulk power system 20. The bulk power system 20 is connected to a power line 21 and a power line 22. The bulk power system 20, the power line 21, and the power line 22 are a power network that supplies electrical power to the facilities 200. In the following, the bulk power system 20, the power line 21, and the power line 22 are collectively referred to as a power system 20.

The facilities 200, the power management apparatus 300, the assignment management apparatus 400, and the request server 500 are connected through a network 30. The network 30 may include the Internet, or may include a mobile communication network. The network 30 may include a virtual private network (VPN).

The facilities 200 each include a distributed power supply 210, a PCS 220, a control device 230, and a computing device 240. In FIG. 1, a facility 200A, a facility 200B, and a facility 200C are exemplified, as the facilities 200. The facility 200A and the facility 200B are connected to the power line 21, and the facility 200C is connected to the power line 22. Each of the facilities 200 may be placed at positions geographically separated from one another. Here, the facility 200A, the facility 200B, and the facility 200C have a similar configuration, and thus, will be collectively referred to as the facility 200 in the following description.

The distributed power supply 210 is a device that outputs electrical power. The distributed power supply 210 may be a device that utilizes renewable energy to output electrical power. For example, the distributed power supply 210 may be a solar cell device. The distributed power supply 210 may be a power storage device or may be a fuel cell device.

The PCS 220 is a power adjustment device configured to convert direct current power output from the distributed power supply 210 to alternating current power.

The control device 230 is an apparatus (for example, an energy management system (EMS)) for managing the electrical power of the facility 200. For example, the control device 230 may manage the output power of the distributed power supply 210, and may control the output power of the distributed power supply 210. The control device 230 may be provided by a cloud service utilizing a server placed on the network 30.

The computing device 240 is an example of the distributed computing device placed in the facility 200. The computing device 240 is only required to be a device that performs some computation processing. For example, the computing device 240 may include a graphics processing unit (GPU), may include a tensor processing unit (TPU), may include a micro processing unit (MPU), or may include a central processing unit (CPU).

Although not particularly limited, the computing device 240 may be a device that processes at least some functions of the control device 230. The computing device 240 may be a device that processes at least some functions of a computer or server placed in the facility 200.

Although not particularly illustrated in FIG. 1, the facility 200 may have a load device such as an air conditioner, or an illumination device. The facility 200 may have a wattmeter (for example, a smart meter) that measures at least one of electrical power from the power system 20 to the facility 200 (hereinafter, referred to as flow power) and electrical power from the facility 200 to the power system 20 (hereinafter, referred to as reverse flow power).

The power management apparatus 300 manages the facilities 200. An entity that manages the power management apparatus 300 may be an electricity retailer, may be an electricity generation utility, may be an electricity transmission and distribution utility, or may be an operator such as a resource aggregator.

The power management apparatus 300 may transmit a control message for adjusting the power supply and demand balance of the power system 20 to the facility 200. For example, the power management apparatus 300 may transmit a flow control message (for example, a demand response (DR)) that requests control of flow power and may transmit a reverse flow control message that requests control of reverse flow power. Furthermore, the power management apparatus 300 may transmit a power supply control message that controls an operating state of the distributed power supply 210. A degree of control of the flow power or the reverse flow power may be expressed as an absolute value (for example, XX kW), or may be expressed as a relative value (for example, XX %). Alternatively, the degree of control of the flow power or the reverse flow power may be expressed by using two or more levels. The degree of control of the flow power or the reverse flow power may be expressed by a power charge (real time pricing (RTP)) defined by the current power supply and demand balance, and may be expressed by a power charge (time of use (TOU)) defined by the past power supply and demand balance.

The power management apparatus 300 may manage the distributed power supply 210 placed in the facility 200 and may manage the PCS 220 placed in the facility 200. The power management apparatus 300 may include a maintenance device that monitors the operating state of the distributed power supply 210.

The assignment management apparatus 400 is an example of a management apparatus that assigns divided computation processing that constitutes at least a part of predetermined computation processing to the computing device 240 placed in the facility 200.

The request server 500 is a server that requests the predetermined computation processing. The predetermined computation processing may include first computation processing that is constantly generated and second computation processing that is temporarily generated. The first computation processing may include mining processing to be used in blockchain technology. The second computation processing may include rendering processing that generates image processing of three-dimensional images or the like.

Power Management Apparatus

Figure 2:
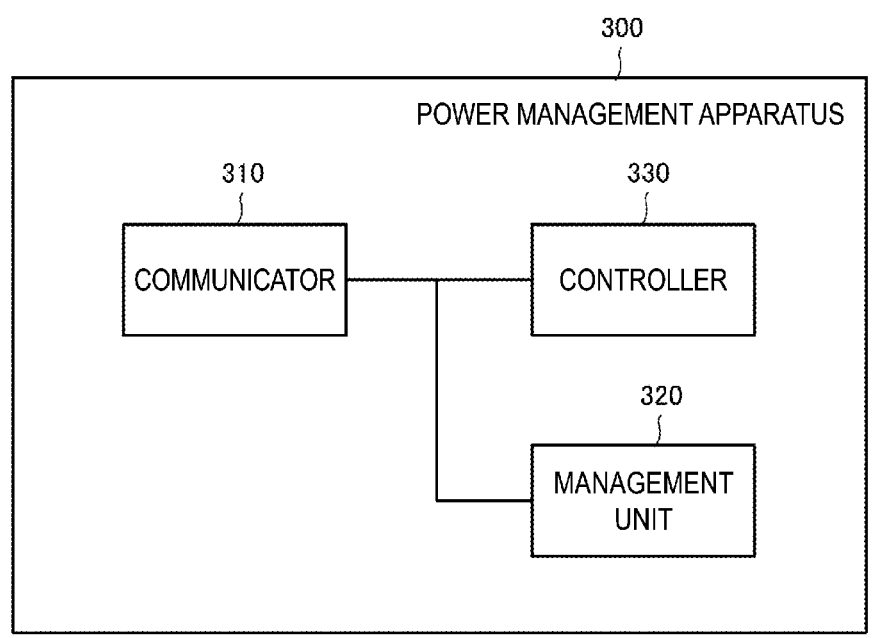
FIG. 2 is a diagram illustrating a power management apparatus 300 according to the embodiment.

The power management apparatus according to the embodiment will be described below. As illustrated in FIG. 2, the power management apparatus 300 includes a communicator 310, a management unit 320, and a controller 330.

The communicator 310 includes a communication module. The communication module may be a wireless communication module compliant with standards such as IEEE 802.11a/b/g/n, ZigBee, Wi-SUN, LTE, 5G, and the like, or may be a wired communication module compliant with standards such as IEEE 802.3.

The communicator 310 receives a message associated with the electrical power of the facility 200 (hereinafter, referred to as a power-related message) from the facility 200. The communicator 310 transmits the power-related message to the assignment management apparatus 400.

The power-related message may include an information element indicating an actual value of the output power of the distributed power supply 210. The power-related message may include an information element indicating an actual value of the power consumption of the facility 200. The power-related message may include an information element indicating an actual value of surplus power generated in the facility 200. The power-related message may include an information element indicating a prediction value of the output power of the distributed power supply 210. The power-related message may include an information element indicating a prediction value of the power consumption of the facility 200. The power-related message may include an information element indicating a prediction value of surplus power generated in the facility 200. The surplus power may be a difference between the output power of the distributed power supply 210 and the power consumption of the facility 200. The power-related message may include an information element indicating whether or not the flow power or the reverse flow power of the facility 200 is controlled by the control message described above.

The management unit 320 includes a memory such as a non-volatile memory and/or a storage medium such as a hard disc drive (HDD), and stores various pieces of information.

The management unit 320 manages information related to the electrical power of the facility 200 (hereinafter, referred to as power-related information). For example, the management unit 320 may manage the power-related information such as the actual value of the flow power of the facility 200, the actual value of the reverse flow power of the facility 200, the actual value of the output power of the distributed power supply 210, the actual value of the power consumption of the facility 200, and the actual value of the surplus power of the facility 200. These pieces of the power-related information may be used for prediction of the flow power of the facility 200, the reverse flow power of the facility 200, the output power of the distributed power supply 210, the power consumption of the facility 200, the surplus power of the facility 200, and the like. The management unit 320 may manage an operation plan of the distributed power supply 210.

The controller 330 may include at least one processor. The at least one processor may be configured of a single integrated circuit (IC) or a plurality of circuits (such as integrated circuits and/or discrete circuits) connected so as to be capable of communicating with each other.

The controller 330 controls elements constituting the power management apparatus 300. For example, the controller 330 may determine whether or not the power supply and demand balance of the power system 20 needs to be adjusted. When necessary, the controller 330 may indicate the transmission of the control message described above to the communicator 310. When requested from an upper node (for example, a power company) of the power management apparatus 300, the controller 330 may instruct the communicator 310 to transmit the control message described above.

Assignment Management Apparatus

Figure 3:
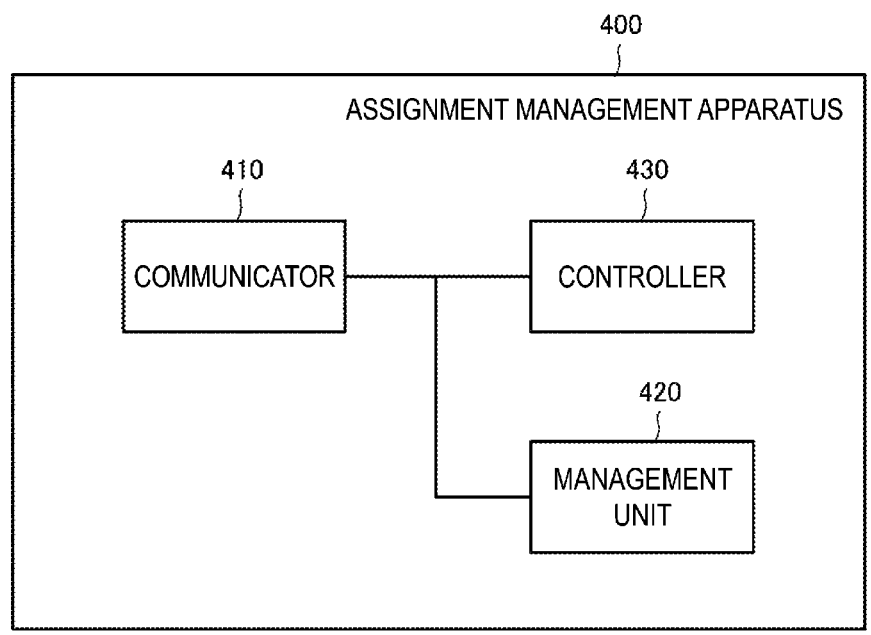
FIG. 3 is a diagram illustrating an assignment management apparatus 400 according to the embodiment.

The assignment management apparatus according to the embodiment will be described below. As illustrated in FIG. 3, the assignment management apparatus 400 includes a communicator 410, a management unit 420, and a controller 430.

The communicator 410 includes a communication module. The communication module may be a wireless communication module compliant with standards such as IEEE 802.11a/b/g/n, ZigBee, Wi-SUN, LTE, 5G, and the like, or may be a wired communication module compliant with standards such as IEEE 802.3.

The communicator 410 constitutes a receiver configured to receive various messages from the facility 200, the power management apparatus 300, or the request server 500. The communicator 410 receives the power-related message from the power management apparatus 300. The communicator 410 may receive the power-related message from the facility 200. The communicator 410 may receive, from the facility 200, a message related to assignment of divided computation processing (hereinafter, referred to as an assignment-related message). The communicator 410 transmits an assignment instruction of divided computation processing to the facility 200.

The assignment-related message may include an information element indicating a source type, may include an information element indicating a processing type, and may include an information element indicating whether execution is possible or not (executability). Details of these information elements will be described later (see FIGS. 9 to 11).

The management unit 420 includes a memory such as a non-volatile memory and/or a storage medium such as a hard disc drive (HDD), and stores various pieces of information.

The management unit 420 may manage the predetermined computation processing requested from the request server 500. The management unit 420 may manage the power-related information of the facility 200. The power-related information may be identified by a message related to the electrical power of the facility 200. The management unit 420 may manage information related to assignment of divided computation processing (hereinafter, referred to as assignment-related information). The assignment-related information may be identified by a message related to assignment of divided computation processing.

Furthermore, the management unit 420 may manage the computation capacity of each computing device 240 as assignment-related information. The computation capacity of each computing device 240 is a parameter that affects the processing time of divided computation processing.

The controller 430 may include at least one processor. The at least one processor may be configured of a single integrated circuit (IC) or a plurality of circuits (such as integrated circuits and/or discrete circuits) connected so as to be capable of communicating with each other.

The controller 430 controls elements constituting the assignment management apparatus 400. In the embodiment, the controller 430 constitutes a controller configured to perform assignment processing that assigns divided computation processing to the computing device 240. The controller 430 may perform the assignment processing based on a type of a power source (hereinafter, referred to as first assignment processing). The controller 430 may perform the assignment processing based on a type of corresponding computation processing that the computing device 240 can handle (hereinafter, referred to as second assignment processing). The controller 430 may perform the assignment processing based on the executability of the computation processing (hereinafter, referred to as third assignment processing). The controller 430 may perform the assignment processing based on at least one of the prediction value of the output power of the distributed power supply 210 and the prediction value of the power consumption of the facility 200 (hereinafter, referred to as fourth assignment processing).

Details of the first assignment processing, the second assignment processing, the third assignment processing, and the fourth assignment processing will be described later.

Predetermined Computation Processing

The predetermined computation processing according to the embodiment will be described below.

Figure 4:
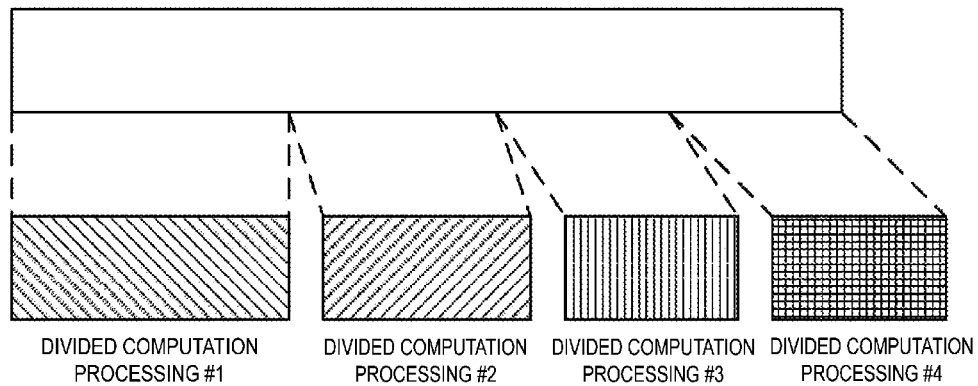
FIG. 4 is a diagram illustrating a predetermined computation processing according to the embodiment.
Figure 4:
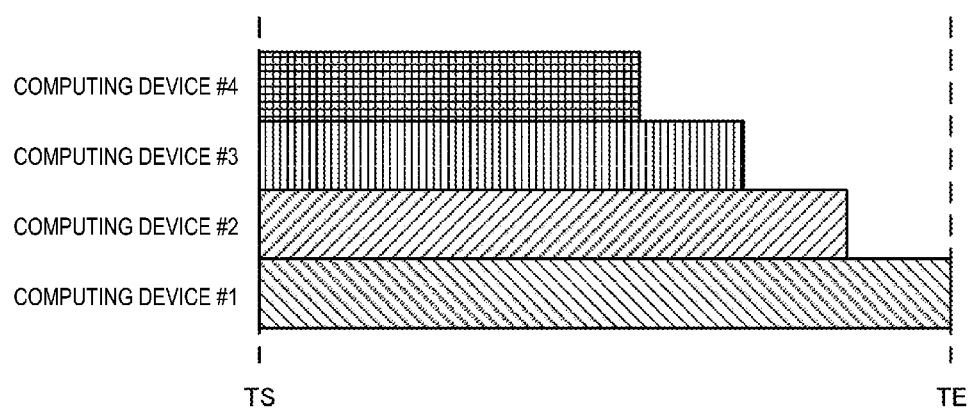
Figure 5:
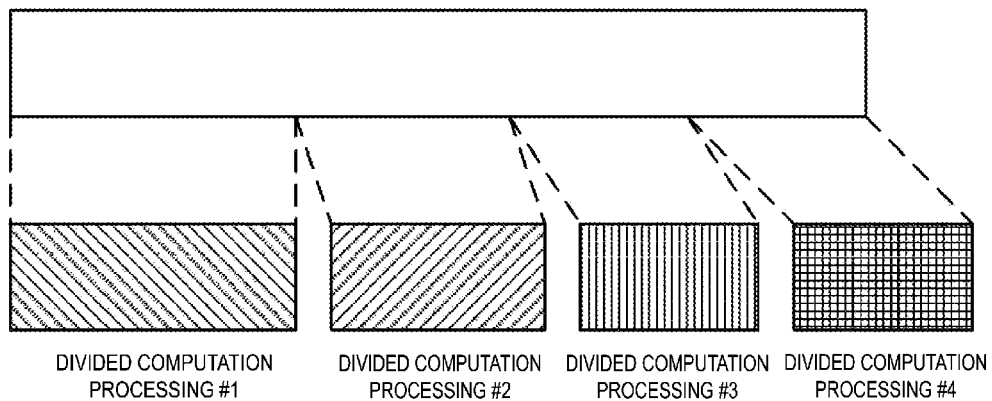
FIG. 5 is a diagram illustrating a predetermined computation processing according to the embodiment.
Figure 5:
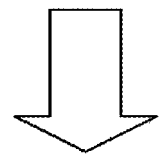
Figure 5:
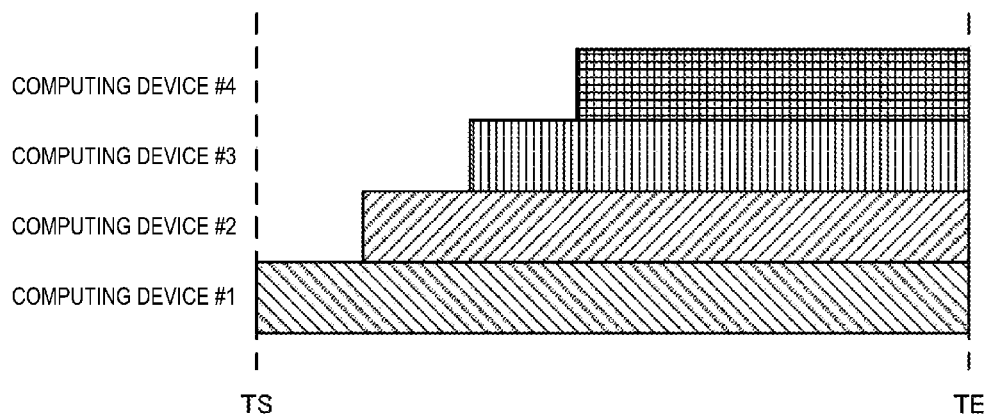
Figure 6:
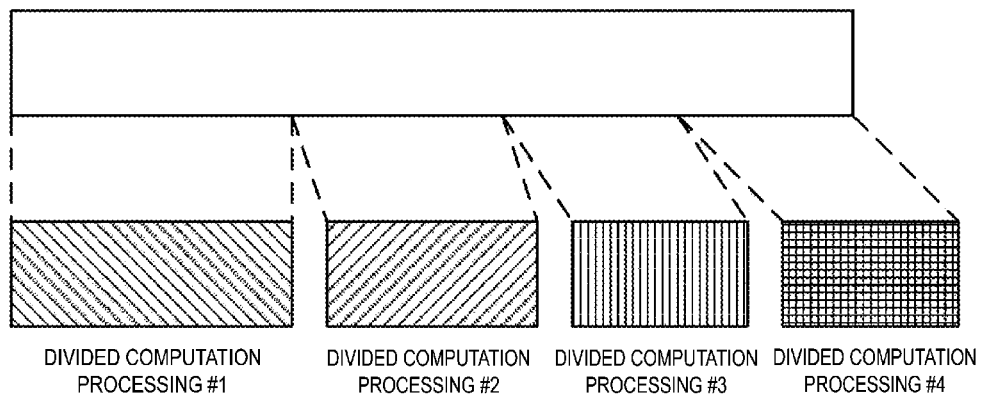
FIG. 6 is a diagram illustrating a predetermined computation processing according to the embodiment.
Figure 6:
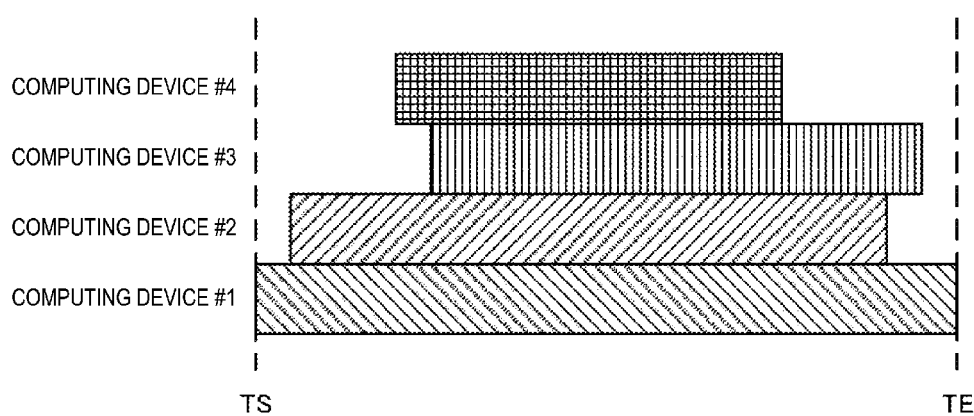

First, as illustrated in FIGS. 4 to 6, the predetermined computation processing is processing capable of being divided into two or more pieces of divided computation processing. Here, a case in which the predetermined computation processing can be divided into four pieces of divided computation processing will be exemplified. For example, a computation load decreases in the order of divided computation processing #1, #2, #3, and #4. Under such an assumption, for the divided computation processing

1 having the largest computation load, a start time is defined as time TS and an end time is defined as time TE. However, the embodiment is not limited to this, any number of pieces of divided computation processing is applicable, and any computation load of each piece of divided computation processing is also applicable.

For example, as illustrated in FIG. 4, the assignment management apparatus 400 may assign divided computation processing to the computing device 240 such that the start time of each piece of divided computation processing is adjusted to the time TS. Alternatively, as illustrated in FIG. 5, the assignment management apparatus 400 may assign divided computation processing to the computing device 240 such that the end time of each piece of divided computation processing is adjusted to the time TE. Alternatively, as illustrated in FIG. 6, the assignment management apparatus 400 may assign divided computation processing to the computing device 240 such that each piece of divided computation processing is performed in a period between the time TS and the time TE. Each piece of divided computation processing may be performed continuously or intermittently.

Although omitted for the sake of simplicity of explanation in FIGS. 4 to 6, the processing time of divided computation processing may vary depending on the processing capacity of the computing device 240 assigned with the divided computation processing.

Figure 7:
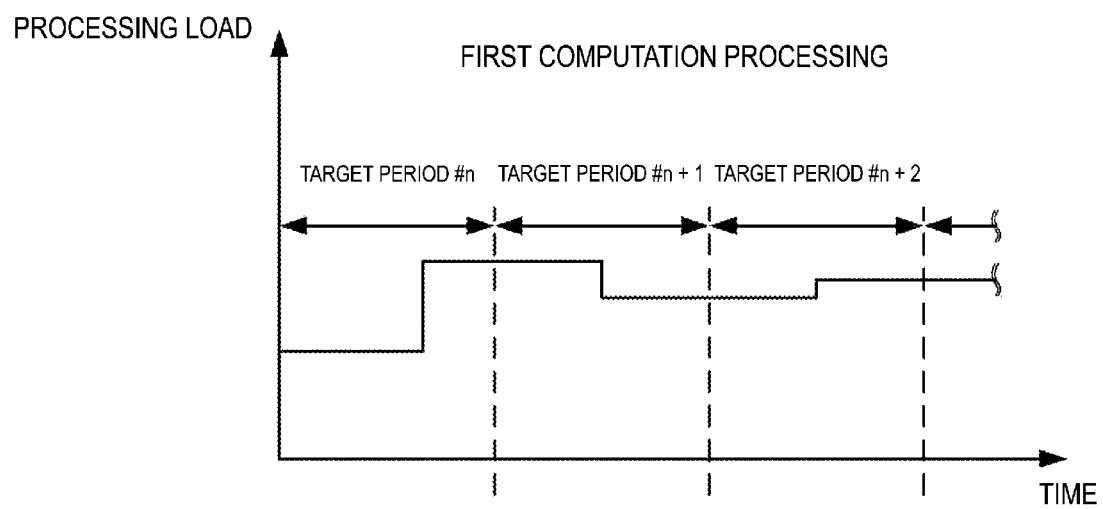
FIG. 7 is a diagram illustrating a predetermined computation processing according to the embodiment.
Figure 8:
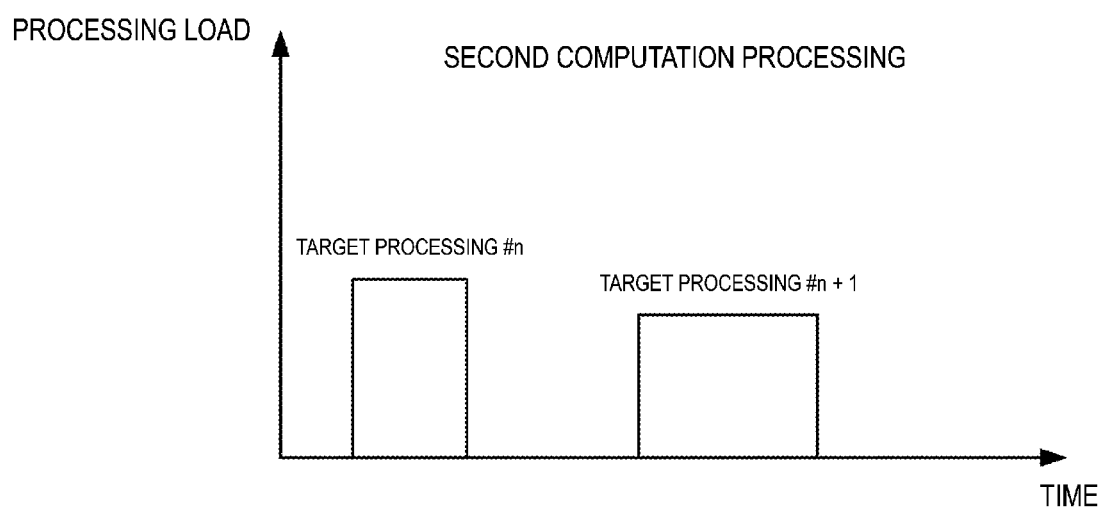
FIG. 8 is a diagram illustrating a predetermined computation processing according to the embodiment.

Second, as illustrated in FIGS. 7 and 8, the predetermined computation processing may include the first computation processing that is constantly generated and the second computation processing that is temporarily generated. The first computation processing may include mining processing to be used in blockchain technology. The second computation processing may include rendering processing that generates image processing of three-dimensional images or the like.

As illustrated in FIG. 7, the first computation processing may be processing that is constantly generated, and thus, may be managed in a separated manner for each target period (for example, one hour, one day, or the like). In such a case, the assignment management apparatus 400 may divide the first computation processing for each target period into two or more pieces of divided computation processing, and may assign each piece of the divided computation processing to the computing device 240. For example, the assignment management apparatus 400 may divide the first computation processing for the target period #n into two or more pieces of divided computation processing, and then, may assign each piece of the divided computation processing to the computing device 240. The same applies to the first computation processing of the target period #n+1 and the target period #n+2.

As illustrated in FIG. 8, the second computation processing may be managed for each target processing, because the second computation processing is processing that is temporarily generated. In such a case, the assignment management apparatus 400 may divide the second computation processing for each target processing into two or more pieces of divided computation processing, and then, may assign each piece of the divided computation processing to the computing device 240. For example, the assignment management apparatus 400 may divide the second computation processing of the target processing #n into two or more pieces of divided computation processing, and then, may assign each piece of the divided computation processing to the computing device 240. The same applies to the second computation processing of the target processing #n+1.

In FIG. 8, the case in which the second computation processing is managed for each target processing is exemplified, but the embodiment is not limited thereto. The second computation processing may be managed in a separated manner for each target period, as in the case of the first computation processing.

Although the first computation processing and the second computation processing are separately described for the sake of simplicity of explanation in FIGS. 7 and 8, the processing time of the first computation processing and the processing time of the second computation processing may temporally overlap with each other.

Assignment-Related Message

The assignment-related message according to the embodiment will be described below.

Figure 9:
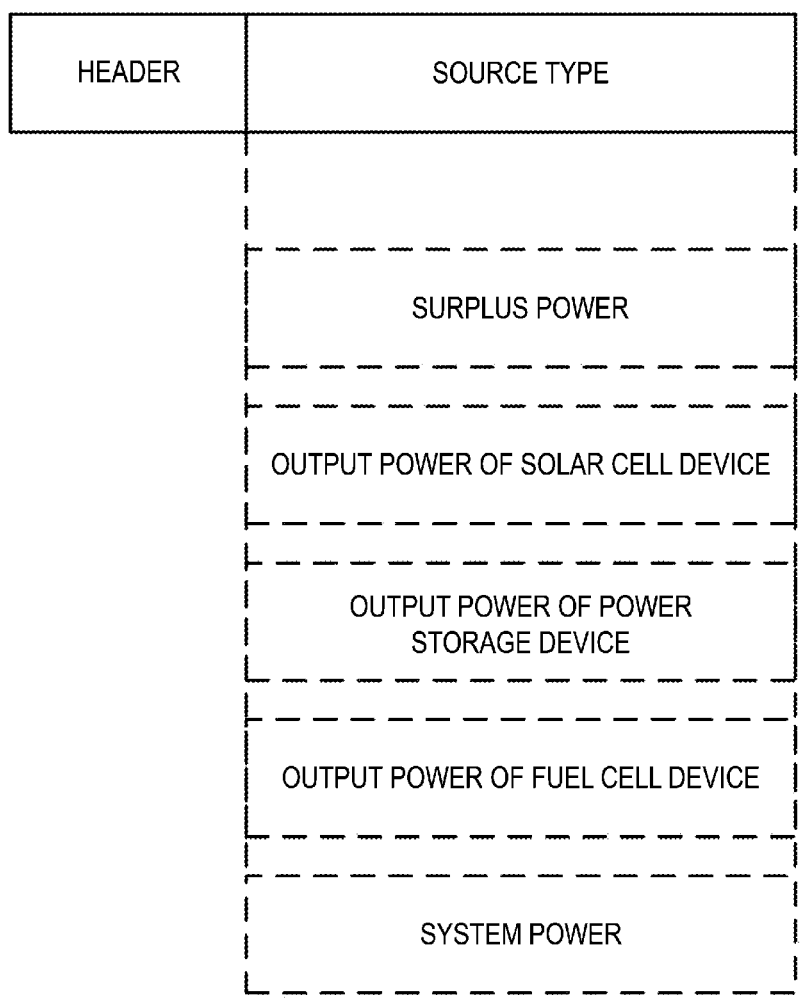
FIG. 9 is a diagram illustrating an assignment-related message according to the embodiment.

First, as illustrated in FIG. 9, the assignment-related message may include an information element (for example, a source type) indicating a type of power source that identifies electrical power allowed as electrical power to be used in the computing device 240. Such an assignment-related message may be referred to as a source type message.

The power source includes at least one of the surplus power of the facility 200, the output power of the distributed power supply 210 placed in the facility 200, and system power to be supplied from the power system 20 connected to the facility 200. In other words, the information element that can be used as the source type may be one or more information elements selected from among the surplus power, the output power of a solar cell device, the output power of a power storage device, the output power of a fuel cell device, and the system power. The source type may be optionally set by a user of the facility 200.

Here, the surplus power refers to electrical power that is not consumed by the facility 200 and is left over. For example, the surplus power may be a difference between the output power of the distributed power supply 210 and the power consumption of the facility 200. In a time period in which the power storage device performs charging, the power consumption of the facility 200 may include the charging power of the power storage device. The surplus power may be defined with the output power of the solar cell device as an upper limit. Note that, before the assignment processing of divided computation processing is performed, electrical power to be required for the divided computation processing is not included in the power consumption of the facility 200.

Each of the output power of the solar cell device, the output power of the power storage device, and the output power of the fuel cell device is one example of the output power of the distributed power supply 210. The system power means electrical power to be supplied from the power system 20 to the facility 200.

Figure 10:
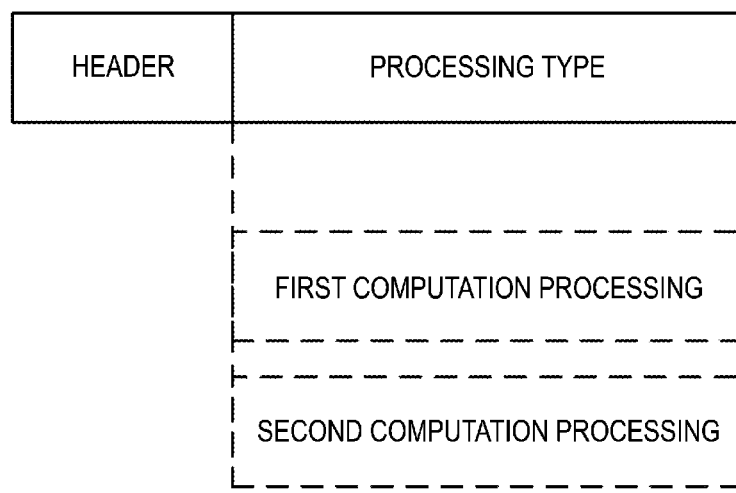
FIG. 10 is a diagram illustrating an assignment-related message according to the embodiment.

Second, as illustrated in FIG. 10, the assignment-related message may include an information element (for example, a processing type) indicating a type of corresponding computation processing that the computing device 240 can handle. Such an assignment-related message may be referred to as a processing type message.

The corresponding computation processing may include the first computation processing that is constantly generated and the second computation processing that is temporarily generated. In other words, the information element that can be used as the processing type may be one or more information elements selected from among the first computation processing and the second computation processing. The processing type may be optionally set by a user of the facility 200.

Figure 11:
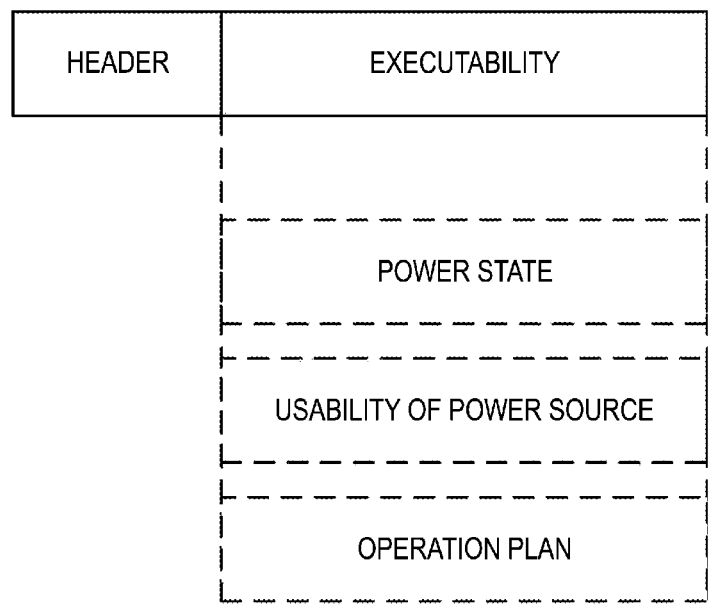
FIG. 11 is a diagram illustrating an assignment-related message according to the embodiment.

Third, as illustrated in FIG. 11, the assignment-related message may include an information element (for example, executability) indicating the executability of the computation processing by the computing device 240. Such an assignment-related message may be referred to as an executability message.

The executability message may include an information element (for example, a power state) indicating whether or not the facility 200 is in a state of power outage, may include an information element indicating the usability of the power source that identifies electrical power allowed as electrical power to be used in the computing device 240, and may include an information element indicating the operation plan of the distributed power supply 210 placed in the facility 200. In other words, the information element indicating executability may be one or more information elements selected from among the power state, the usability of the power source, and the operation plan of the distributed power supply 210. The executability can be optionally set by a user of the facility 200.

Here, the power state may include an information element providing a current state in response to power outage of the facility 200, and may include an information element providing a current state in response to power recovery of the facility 200. The power state may include a power outage plan of the facility 200. The power outage plan may include a time period during which power outage occurs in a target period (for example, one hour, one day, or the like). The power outage means that supply of electrical power from the power system 20 to the facility 200 stops. Thus, even in the state of the power outage, electrical power may be supplied from the distributed power supply 210 (a self-sustaining operation state).

The usability of the power source is information indicating whether the power source described above can be used or not as electrical power to be used by the computing device 240. The operation plan of the distributed power supply 210 is an operating state of the distributed power supply 210 that is planned in a target period (for example, one hour, one day, or the like). The operation plan may include a maintenance plan of the distributed power supply 210 and may include a plan developed by the control device 230 described above.

In FIGS. 9 to 11, a header may include an information element that identifies the facility 200 that is a source of a message. The header may include an information element that identifies the assignment management apparatus 400 that is a destination of a message. The header may include an information element that identifies a type of a message.

In FIGS. 9 to 11, a case is exemplified in which the source type message, the processing type message, and the executability message are separately defined. However, the embodiment is not limited to this example. Specifically, the assignment-related message may include two or more information elements selected from among the source type, the processing type, and the executability. For example, the assignment-related message may be a message that identifies a type of corresponding computation processing for each power source. Alternatively, the assignment-related message may be a message that identifies, for each power source, the executability of the computation processing by the computing device 240. Alternatively, the assignment-related message may be a message that identifies, for each power source, the type of corresponding computation processing and the executability of the computation processing by the computing device 240.

Power-Related Message

The power-related message according to the embodiment will be described below.

The power-related message includes an information element (for example, the power-related information) for predicting an amount of electrical power that can be used in the computing device 240. As described above, the power-related information may include an information element indicating at least one of an actual value of the output power of the distributed power supply 210, a prediction value of the output power of the distributed power supply 210, an actual value of the power consumption of the facility 200, a prediction value of the power consumption of the facility 200, an actual value of the surplus power of the facility 200, and a prediction value of the surplus power of the facility 200. The actual value may be used for prediction of the prediction value. The power-related information may be identified by the control device 230 described above.

Here, the output power of the distributed power supply 210 may include the output power of a solar cell device, may include the output power of a power storage device, and may include the output power of a fuel cell device. The prediction value of the output power of the solar cell device may include an amount of solar radiation to the solar cell device. The prediction value of the output power of the power storage device may include a residual amount of electricity of the power storage device. The prediction value of the output power of the fuel cell device may include a rated output of the fuel cell device.

Figure 12:
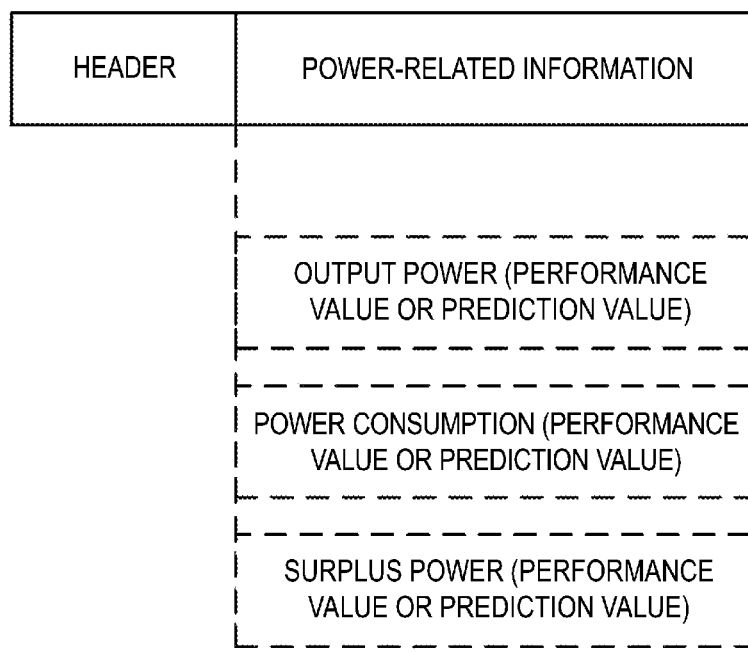
FIG. 12 is a diagram illustrating a power-related message according to the embodiment.

In FIG. 12, the header may include an information element that identifies the facility 200 that is a source of a message. The header may include an information element that identifies the assignment management apparatus 400 that is a destination of a message. The header may include an information element that identifies a type of a message.

First Assignment Processing

First assignment processing will be described below. The assignment management apparatus 400 assigns divided computation processing to the computing device 240 based on at least a type of power source. The type of power source can be identified by using the source type message described above (see FIG. 9).

For example, the assignment management apparatus 400 (controller 430) may perform the assignment processing based on a power selling price of the surplus power when the power source is the surplus power of the facility 200. Specifically, the assignment management apparatus 400 may assign divided computation processing to the computing device 240 when the power selling price of the surplus power is lower than a predetermined threshold value, without assigning divided computation processing to the computing device 240 when the power selling price of the surplus power is higher than the predetermined threshold value. Note that being lower than the predetermined threshold value is not limited to being below the predetermined threshold value, and may also include a case of being equal to or lower than the predetermined threshold value, and the same applies to the following description. According to such a configuration, it is possible to reduce disadvantages of the facility 200 caused by the assignment of divided computation processing. For example, when the power selling price of the surplus power is changed during computation processing based on estimated processing time, the assignment management apparatus 400 may calculate a power selling price per amount of electrical power to be used by the computing device 240, and may assign divided computation processing to the computing device 240 when the power selling price is lower than the predetermined threshold value. As another condition, the assignment management apparatus 400 does not need to assign divided computation processing to the computing device 240 when the power selling price before the change or after the change is higher than the predetermined threshold value, and may assign divided computation processing to the computing device 240 only when the power selling price before the change and after the change is lower than the predetermined threshold value.

For example, the assignment management apparatus 400 (controller 430) may perform the assignment processing based on the prediction value of the output power of the distributed power supply 210 when the power source is the output power of the distributed power supply 210. The prediction value of the output power of the distributed power supply 210 can be identified by the power-related message described above. Specifically, the assignment management apparatus 400 may identify a processing load and processing time of divided computation processing to be assigned to the computing device 240 based on the prediction value of the output power. This is because the processing load and the processing time that the computing device 240 can handle depend on the output power. The assignment management apparatus 400 may perform the assignment processing based on the prediction value of the output power and the processing capacity of the computing device 240. According to such a configuration, divided computation processing can be appropriately assigned to the computing device 240.

For example, when the prediction value of the output power of the distributed power supply 210 is higher than a predetermined value of the output power, processing is assigned to the computing device 240 of the facility in which the distributed power supply 210 is placed. When the prediction value of the output power of the distributed power supply 210 is lower than the predetermined value of the output power, processing is not assigned to the computing device 240 of the facility in which the distributed power supply 210 is placed. Furthermore, time when the prediction value of the output power of the distributed power supply 210 becomes higher than the predetermined value of the output power may be predicted. In this case, before the predicted time, the divided computation processing that is scheduled to be later processed by the computing device 240 is sent to the computing device 240. Then, when the value of the output power of the distributed power supply 210 becomes higher than the predetermined value of the output power, the computing device 240 starts the divided computation processing sent in advance.

Further, in addition to the prediction value of the output power of the distributed power supply 210, duration time during which the output power continues to be higher than the predetermined value may be predicted. The assignment management apparatus 400 may identify the processing load and the processing time of the divided computation processing to be assigned to the computing device 240 based on the duration time during which the output power is higher than the predetermined value.

For example, in a case where the power source is a power storage device, the assignment management apparatus 400 (controller 430) may perform the assignment processing based on a residual amount of electricity of the power storage device. The residual amount of electricity of the power storage device can be identified by the power-related message described above. Specifically, the assignment management apparatus 400 may identify a processing load and processing time of divided computation processing to be assigned to the computing device 240 based on the residual amount of electricity of the power storage device. This is because the processing load and the processing time that the computing device 240 can handle depend on the residual amount of electricity. The assignment management apparatus 400 may perform the assignment processing based on the residual amount of electricity of the power storage device and the processing capacity of the computing device 240. According to such a configuration, divided computation processing can be appropriately assigned to the computing device 240.

For example, when the power source is system power, the assignment management apparatus 400 (controller 430) may perform the assignment processing based on a power purchasing price of the system power. Specifically, the assignment management apparatus 400 may not assign divided computation processing to the computing device 240 when the power purchasing price of the system power is higher than a predetermined threshold value, and may assign divided computation processing to the computing device 240 when the power purchasing price of the system power is lower than the predetermined threshold value. According to such a configuration, it is possible to reduce disadvantages of the facility 200 caused by the assignment of divided computation processing. For example, when the purchasing price of the system power is changed during the computation processing based on the estimated processing time, the assignment management apparatus 400 may calculate a power purchasing unit price per amount of electrical power to be used by the computing device 240, and may assign divided computation processing to the computing device 240 when the power purchasing unit price is lower than the predetermined threshold value. As another condition, the assignment management apparatus 400 does not need to assign divided computation processing to the computing device 240 when the power purchasing price before the change or after the change is higher than the predetermined threshold value, and may assign divided computation processing to the computing device 240 only when the power purchasing price before the change and after the change is lower than the predetermined threshold value.

For example, the information element (source type) may be configured to be capable of specifying two or more power source types as the power source type. In such a case, when the surplus power and the system power are specified as the power source types, the assignment management apparatus 400 (controller 430) may identify the power source to be used in the computing device 240 from among the two or more power sources based on the power selling price of the surplus power and the power purchasing price of the system power, and may perform the assignment processing based on the identified power source. Specifically, the assignment management apparatus 400 does not need to assign divided computation processing to the computing device 240 in order to suppress a decrease in surplus power when the power selling price of the surplus power is higher than the predetermined threshold value. The assignment management apparatus 400 may assign divided computation processing to the computing device 240 within a range of the surplus power (in other words, within a range in which purchasing of the system power does not occur) when the power selling price of the surplus power is lower than the predetermined threshold value and the power purchasing price of the system power is higher than the predetermined threshold value. The assignment management apparatus 400 may assign divided computation processing to the computing device 240 under the assumption that the surplus power and the system power are used when the power selling price of the surplus power is lower than the predetermined threshold value and the power purchasing price of the system power is lower than the predetermined threshold value.

For example, the assignment management apparatus 400 (controller 430) may perform the assignment processing with two or more computing devices individually placed in two or more facilities being as targets, and may perform the assignment processing such that the computing device 240 for which the identified power source is allowed as the power source satisfies a predetermined condition. The predetermined condition may include a condition that the number of computing devices 240 (hereinafter, referred to as green computing devices 240) that use, as the power source, the output power of the distributed power supply 210 (for example, a solar cell device) that uses renewable energy to output electrical power is a certain number or more. The predetermined condition may include a condition that a rate of the number of green computing devices 240 with respect to the total number of the computing devices 240 that process predetermined computation processing is equal to or larger than a certain rate. The predetermined condition may include a condition that the power consumption of the green computing devices 240 is equal to or larger than a certain amount. The predetermined condition may include a condition that a rate of the power consumption of the green computing devices 240 with respect to the total power consumption of the computing devices 240 that process predetermined computation processing is equal to or larger than a certain rate.

For example, the assignment management apparatus 400 (controller 430) may perform the assignment processing based on a request level of the predetermined computation processing. The request level may include a request compensation for the predetermined computation processing, and may include urgency or priority of the predetermined computation processing.

In such a case, the predetermined threshold value that is compared to the power selling price of the surplus power or the power purchasing price of the system power may be set based on the request level of the predetermined computation processing, and when the power selling price of the surplus power or the power purchasing price of the system power is lower than the predetermined threshold value, divided computation processing may be assigned to the computing device 240. For example, the higher the request compensation is, the higher a threshold value is set as the predetermined threshold value. The predetermined threshold value may be equal to the request compensation or may be different from the request compensation. Similarly, the higher the urgency or priority is, the higher a threshold value is set as the predetermined threshold value.

Alternatively, the assignment management apparatus 400 may perform the assignment processing based on a cost of the output power of a power storage device (a cost required along with charging of the power storage device) and the request level of the predetermined computation processing. The assignment management apparatus 400 may perform the assignment processing based on a cost of the output power of a fuel cell device (a cost required for power generation of the fuel cell device) and the request level of the predetermined computation processing.

Second Assignment Processing

Second assignment processing will be described below. The assignment management apparatus 400 assigns divided computation processing to the computing device 240 based on at least a type of corresponding computation processing.

The type of corresponding computation processing can be identified by using the processing type message described above (see FIG. 10). As described above, the predetermined computation processing may include the first computation processing that is constantly generated and the second computation processing that is temporarily generated.

For example, the assignment management apparatus 400 (controller 430) does not assign divided computation processing to the computing device 240 where the type of corresponding computation processing is not the first computation processing, but assigns divided computation processing to the computing device 240 where the type of corresponding computation processing is the first computation processing, when the predetermined computation processing is the first computation processing. Similarly, the assignment management apparatus 400 does not assign divided computation processing to the computing device 240 where the type of corresponding computation processing is not the second computation processing, but assigns divided computation processing to the computing device 240 where the type of corresponding computation processing is the second computation processing, when the predetermined computation processing is the second computation processing.

Here, a request compensation for the first computation processing may be lower than a request compensation for the second computation processing. Furthermore, the second assignment processing may be combined with the first assignment processing described above.

Third Assignment Processing

Third assignment processing will be described below. The assignment management apparatus 400 assigns divided computation processing to the computing device 240 based on at least the executability of the computation processing by the computing device 240. The executability of the computation processing can be identified by using the executability message described above (see FIG. 11).

For example, the assignment management apparatus 400 (controller 430) assigns divided computation processing to the computing device 240 that is capable of executing the computation processing without assigning divided computation processing to the computing device 240 that is not capable of executing the computation processing. In such a case, the third assignment processing may be considered to be processing that assigns divided computation processing to the computing device 240 in a time period in which the computation processing can be executed without assigning divided computation processing to the computing device 240 in a time period in which the computation processing cannot be executed.

Here, the third assignment processing may be combined with the first assignment processing described above, and may be combined with the second assignment processing described above.

Fourth Assignment Processing

Fourth assignment processing will be described below. The assignment management apparatus 400 performs assignment processing based on at least one of the prediction value of the output power of the distributed power supply 210, the prediction value of the power consumption of the facility 200, and the prediction value of the surplus power of the facility 200. These prediction values can be identified by using the power-related message described above (see FIG. 12).

For example, the assignment management apparatus 400 (controller 430) may perform the assignment processing based on the prediction value of the output power of the distributed power supply 210. The prediction value of the output power of the distributed power supply 210 can be used for prediction of the surplus power in a case in which the surplus power of the facility 200 is used in the computation processing by the computing device 240. Of course, the prediction value of the output power of the distributed power supply 210 is useful in a case where the output power of the distributed power supply 210 is used in the computation processing by the computing device 240. In other words, the assignment management apparatus 400 may specify a processing load and processing time of divided computation processing to be assigned to the computing device 240 based on the prediction value of the output power of the distributed power supply 210.

For example, the assignment management apparatus 400 (controller 430) may perform the assignment processing based on the prediction value of the power consumption of the facility 200. The prediction value of the power consumption of the facility 200 can be used for prediction of the surplus power in a case where the surplus power of the facility 200 is used in the computation processing by the computing device 240. In other words, the assignment management apparatus 400 may identify the processing load and the processing time of the divided computation processing to be assigned to the computing device 240 based on the prediction value of the power consumption of the facility 200.

For example, the assignment management apparatus 400 (controller 430) may perform the assignment processing based on the prediction value of the surplus power of the facility 200. Of course, the prediction value of the surplus power of the facility 200 is useful in a case where the surplus power of the facility 200 is used in the computation processing by the computing device 240. In other words, the assignment management apparatus 400 may identify the processing load and the processing time of the divided computation processing to be assigned to the computing device 240 based on the prediction value of the surplus power of the facility 200.

For example, when the prediction value of the surplus power of the facility 200 is higher than a predetermined value of electrical power, the processing is assigned to the computing device 240 of the facility 200. When the prediction value of the surplus power of the facility 200 is lower than the predetermined value of electrical power, the processing is not assigned to the computing device 240 of the facility 200. Furthermore, time when the prediction value of the surplus power of the facility 200 becomes higher than the predetermined value of electrical power may be predicted. The time may be any combination of a year, a month, a day, an hour, a minute, and a second. In addition, before the predicted time, the divided computation processing that is scheduled to be later processed is sent to the facility 200 or the computing device 240 of the facility 200. Then, when the value of the surplus power of the facility 200 is higher than the predetermined value of electrical power, the computing device 240 placed in the facility 200 starts the divided computation processing that is sent in advance.

Further, in addition to the prediction value of the surplus power of the facility 200, duration time during which electrical power continues to be higher than the predetermined value may be predicted. The assignment management apparatus 400 may identify a processing load of the divided computation processing to be assigned to the facility 200 such that the processing is completed within the duration time during which the output power is higher than the predetermined value.

Here, the fourth assignment processing may be combined with the first assignment processing described above, may be combined with the second assignment processing described above, and may be combined with the third assignment processing described above.

Power Management Method

A power management method according to the embodiment will be described below.

Figure 13:
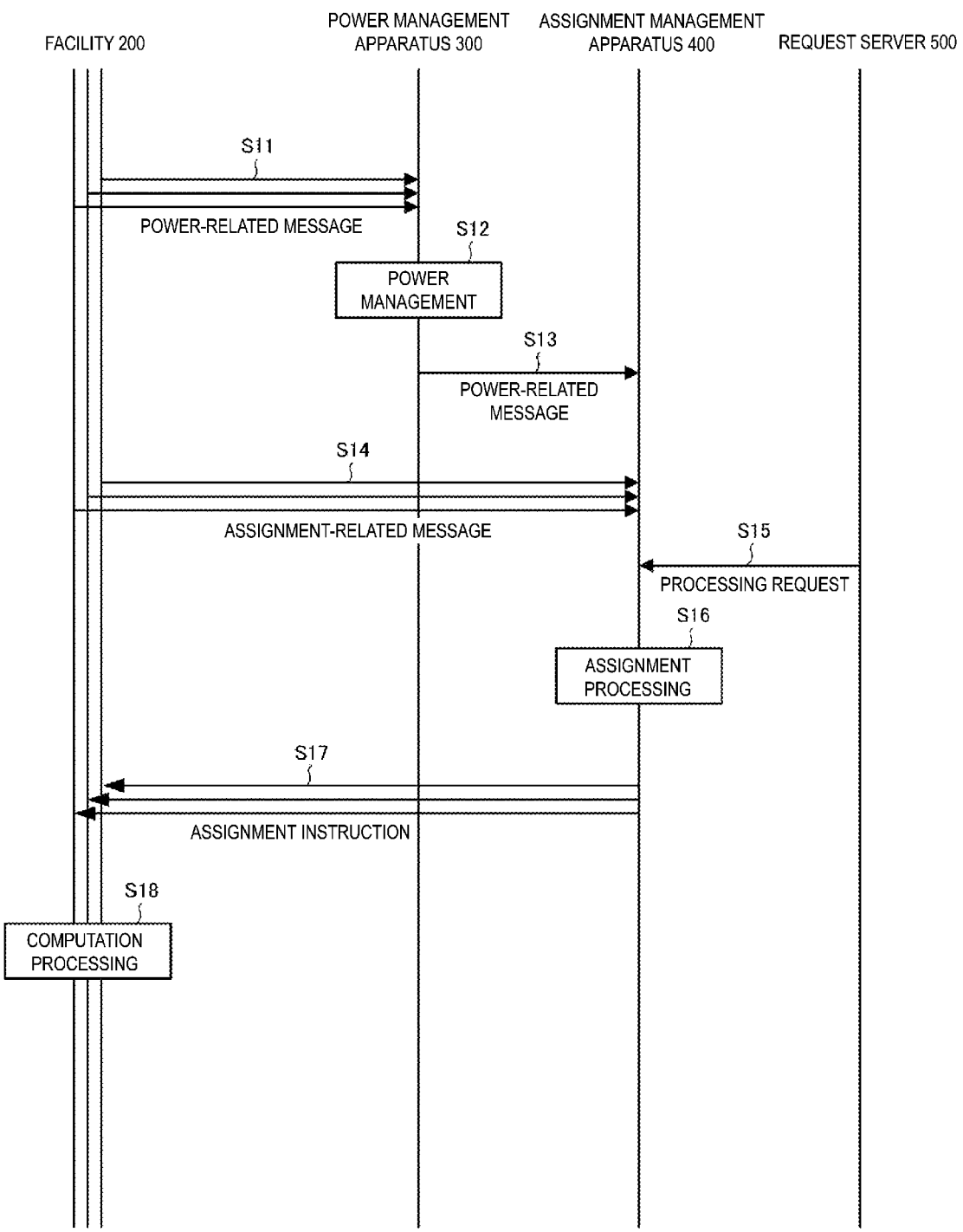
FIG. 13 is a diagram illustrating a power management method according to the embodiment.

As illustrated in FIG. 13, in step S11, each facility 200 transmits the power-related message (see FIG. 12) to the power management apparatus 300. Each facility 200 may transmit the power-related message at a predetermined cycle (for example, every 30 minutes).

In step S12, the power management apparatus 300 manages the electrical power of each facility 200 based on the power-related message.

In step S13, the power management apparatus 300 transmits the power-related message (see FIG. 12) to the assignment management apparatus 400. The power management apparatus 300 may transmit the power-related message at a predetermined cycle (for example, every 30 minutes). Alternatively, the power management apparatus 300 may transmit the power-related message in response to a request from the assignment management apparatus 400.

Here, the content of the power-related message transmitted in step S13 may be different from the content of the power-related message received in step S11. For example, when the content of the power-related message received in step S11 is an actual value, the content of the power-related message transmitted in step S13 may be a prediction value.

In step S14, each facility 200 transmits the assignment-related message (see FIGS. 9 to 11) to the assignment management apparatus 400.

In step S15, the assignment management apparatus 400 receives a processing request for the predetermined computation processing from the request server 500. The processing request may include a request level of the predetermined computation processing.

In step S16, the assignment management apparatus 400 performs assignment processing that assigns divided computation processing to the computing device 240. The assignment processing may include one or more types of assignment processing selected from among the first assignment processing to the fourth assignment processing described above.

In step S17, the assignment management apparatus 400 transmits an assignment instruction including an assignment result of step S16 to each facility 200.

In step S18, each facility 200 (each computing device 240) performs the divided computation processing in accordance with the assignment instruction.

In FIG. 13, the processing of step S15 is performed after the processing of step S14, but the embodiment is not limited thereto.

Actions and Effects

In the embodiment, the assignment management apparatus 400 may assign divided computation processing to the computing device 240 based on the type of power source. According to such a configuration, the divided computation processing can be appropriately assigned to the computing device 240 in a manner that matches a user's desire of the facility 200.

In the embodiment, the assignment management apparatus 400 may assign divided computation processing to the computing device 240 based on the type of corresponding computation processing. According to such a configuration, the divided computation processing can be appropriately assigned to the computing device 240 in a manner that matches a user's desire of the facility 200.

In the embodiment, the assignment management apparatus 400 may assign divided computation processing to the computing device 240 based on the executability by the computing device 240. According to such a configuration, the divided computation processing can be appropriately assigned to the computing device 240.

In the embodiment, the assignment management apparatus 400 may perform the assignment processing based on at least one of the prediction value of the output power of the distributed power supply 210, the prediction value of the power consumption of the facility 200, and the prediction value of the surplus power of the facility 200. According to such a configuration, by identifying the processing load and processing time of the computation processing by the computing device 240, the divided computation processing can be appropriately assigned to the computing device 240.

Modification Example 1

Modification Example 1 of the embodiment will be described below. In the following, differences from the embodiment will be mainly described.

In the embodiment, the prediction value of the output power of the distributed power supply 210 is identified by using the power-related message received from the facility 200 or the power management apparatus 300. In contrast, in Modification Example 1, the prediction value of the output power of the distributed power supply 210 is identified based on a first parameter that affects the output power of the distributed power supply 210.

Specifically, the assignment management apparatus 400 identifies the prediction value of the output power of the distributed power supply 210 based on the first parameter. The assignment management apparatus 400 may receive, from the facility 200, a message including an information element indicating the first parameter. The assignment management apparatus 400 may receive a message including an information element indicating the first parameter from an external device other than the assignment management apparatus 400. The external device other than the assignment management apparatus 400 may identify the prediction value of the output power of the distributed power supply 210 based on the first parameter. In such a case, the external device may be the control device 230 or the power management apparatus 300.

For example, when the distributed power supply 210 is a solar cell device, the first parameter may include weather information in a region where the facility 200 is placed. The weather information may include sunrise time, sunset time, weather, temperature, humidity, wind force, a sunlight amount, and the like. In such a case, the external device may be the power management apparatus 300, and may be an external server that manages the weather information.

In a case where the distributed power supply 210 is a power storage device, the first parameter may be an operation plan (for example, a charge-discharge plan) of the power storage device. The operation plan may be developed by the control device 230 of the facility 200. The operation plan may be developed by the power management apparatus 300. In these cases, the external device may be the control device 230 or the power management apparatus 300.

When the distributed power supply 210 is a fuel cell device, the first parameter may be an operation plan (for example, a maintenance plan) of the fuel cell device. The operation plan may be developed by the control device 230 of the facility 200. The operation plan may be developed by the power management apparatus 300. In these cases, the external device may be the power management apparatus 300.

Furthermore, the first parameter may be an actual value (for example, history) of the output power of the distributed power supply 210. As described above, the actual value of the output power may be included in the power-related message. In such a case, the external device may be the control device 230 or the power management apparatus 300.

Modification Example 2

Modification Example 2 of the embodiment will be described below. In the following, differences from the embodiment will be mainly described.

In the embodiment, the prediction value of the power consumption of the facility 200 is identified by the power-related message received from the facility 200 or the power management apparatus 300. In contrast, in Modification Example 2, the prediction value of the power consumption of the facility 200 is identified based on a second parameter that affects the power consumption of the facility 200.

Specifically, the assignment management apparatus 400 identifies the prediction value of the power consumption of the facility 200 based on the second parameter. The assignment management apparatus 400 may receive, from the facility 200, a message including an information element indicating the second parameter. The assignment management apparatus 400 may receive a message including the information element indicating the second parameter from an external device other than the assignment management apparatus 400. The external device other than the assignment management apparatus 400 may identify the prediction value of the power consumption of the distributed power supply 210 based on the second parameter. In such a case, the external device may be the control device 230 or the power management apparatus 300.

The second parameter may be an operation plan of a load device placed in the facility 200. The operation plan of the load device may be an energy saving plan based on energy saving policy of the facility 200 or the like. The operation plan may be developed by the control device 230 of the facility 200. The operation plan may be developed by the power management apparatus 300. In these cases, the external device may be the control device 230 or the power management apparatus 300.

The second parameter may be an actual value (for example, history) of the power consumption of the facility 200. As described above, the actual value of the power consumption may be included in the power-related message. In such a case, the external device may be the control device 230 or the power management apparatus 300.

Modification Example 3

Modification Example 3 of the embodiment will be described below. In the following, differences from Modification Example 1 and Modification Example 2 will be mainly described.

Although not particularly described in Modification Example 1 and Modification Example 2, the first parameter and the second parameter may be an adjustment request for requesting adjusting the power supply and demand balance of the power system 20. The adjustment request may include suppression of flow power (demand response or negawatt trading) and may include suppression of reverse flow. Specifically, the assignment management apparatus 400 may perform the assignment processing based on the adjustment request instructing the adjustment of the flow power to the facility 200 from the power system 20 connected to the facility 200 or the reverse flow power from the facility 200 to the power system 20.

Power Management Method

Figure 14:
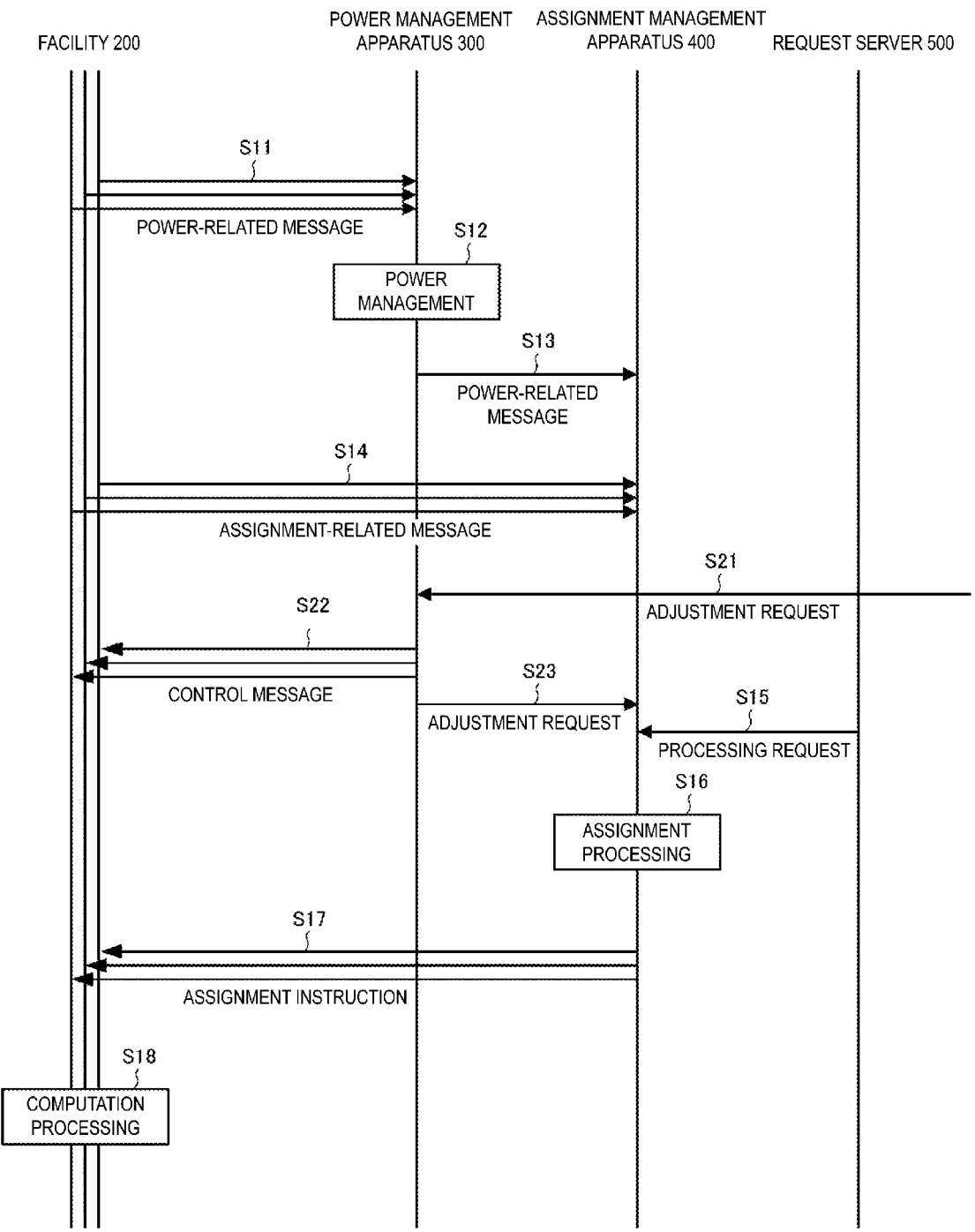
FIG. 14 is a diagram illustrating a power management method according to Modification Example 3.

A power management method according to Modification Example 3 will be described below. In FIG. 14, a similar numeral sign is given to processing similar to that in FIG. 13. The description of the processing similar to that in FIG. 13 is omitted.

As illustrated in FIG. 14, in step S21, the power management apparatus 300 receives an adjustment request for requesting adjusting the power supply and demand balance of the power system 20. For example, the power management apparatus 300 receives the adjustment request from an upper node (for example, a power company) of the power management apparatus 300.

In step S22, the power management apparatus 300 transmits, to each facility 200, a control message for adjusting the power supply and demand balance of the power system 20 in response to the adjustment request.

In step S23, the power management apparatus 300 transmits the adjustment request to the assignment management apparatus 400. The content of the adjustment request transmitted in step S23 may be different from the content of the adjustment request received in step S21. For example, the content of the adjustment request transmitted in step S23 may be the content of the control message transmitted to each facility 200 in step S22.

Note that the assignment management apparatus 400 may identify at least one of the prediction value of the output power of the distributed power supply 210 and the prediction value of the power consumption of the facility 200 based on the adjustment request received in step S23. Furthermore, the assignment management apparatus 400 may identify the prediction value of the surplus power of the facility 200 based on the adjustment request received in step S23. In response to the adjustment request, each facility 200 that receives the control message for adjusting the power supply and demand balance of the electrical power of the power system 20 may again transmit the power-related message to the power management apparatus 300, and may transmit the assignment-related message to the assignment management apparatus 400.

Modification Example 4

Modification Example 4 of the embodiment will be described below. In the following, differences from the embodiment will be mainly described.

In Modification Example 4, the facility 200 may include a first facility configured to output reverse flow power to the power system 20. The first facility may be a power generation facility that mainly outputs electrical power. The facility 200 may include a second facility configured such that flow power is supplied from the power system 20. The second facility may be a demanding facility that mainly consumes electrical power. For example, the first facility and the second facility may construct a self-consignment system that supplies electrical power from the first facility to the second facility via the power system 20. Under the background described above, the power management system 100 may include a third party server that checks various matters.

The third party server may check a difference between a planned output value of electrical power to be output from the first facility and an actual output value of electrical power output from the first facility. The planned output value and the actual output value are aggregated every unit time (for example, 30 minutes). When the difference between the planned output value and the actual output value exceeds an allowable threshold value, a penalty may be imposed on an entity that manages the first facility. When the difference between the planned output value and the actual output value does not exceed the allowable threshold value, an incentive may be given to the entity that manages the first facility. The penalty and the incentive may be financial.

The third party server may check a difference between a planned demand value of electrical power to be supplied to the second facility and an actual demand value of electrical power to be supplied to the second facility. The planned demand value and the actual demand value are aggregated every unit time (for example, 30 minutes). When the difference between the planned demand value and the actual demand value exceeds an allowable threshold value, a penalty may be imposed on an entity that manages the second facility. When the difference between the planned demand value and the actual demand value does not exceed the allowable threshold value, an incentive may be given to the entity that manages the second facility. The penalty and the incentive may be financial.

The third party server may check a difference between a planned procurement value to be procured from the power system 20 to the second facility and an actual procurement value procured from the power system 20 to the second facility. The planned procurement value is a value excluding the planned output value from the planned demand value, and the actual procurement value is a value excluding the actual output value from the actual demand value. The planned procurement value and the actual procurement value are aggregated every unit time (for example, 30 minutes). When the difference between the planned procurement value and the actual procurement value exceeds an allowable threshold value, a penalty may be imposed on the entity that manages the second facility. When the difference between the planned procurement value and the actual procurement value does not exceed the allowable threshold value, an incentive may be given to the entity that manages the second facility. The penalty and the incentive may be financial.

Note that the planned procurement value may be a value corrected in consideration of a transmission loss from the first facility to the second facility. Alternatively, the planned output value may be a value corrected in consideration of the transmission loss from the first facility to the second facility. Similarly, the actual procurement value may be a value corrected in consideration of the transmission loss from the first facility to the second facility. Alternatively, the actual output value may be a value corrected in consideration of the transmission loss from the first facility to the second facility. The consideration of the transmission loss means that a value corresponding to the transmission loss is subtracted from the planned value or the actual value.

In such a case, the assignment management apparatus 400 may perform assignment processing for the first facility such that a difference between a planned value of reverse flow power (that is, the planned output value described above) and a performance value of the reverse flow power (that is, the actual output value described above) is less than or equal to an allowable threshold value. In this way, the assignment processing may be performed such that the difference between the planned output value and the actual output value does not exceed the allowable threshold value.

The assignment management apparatus 400 may perform assignment processing for the first facility such that a difference between a planned value of flow power (that is, the planned demand value described above) and an actual value of the flow power (that is, the actual demand value described above) is less than or equal to an allowable threshold value. In this way, the assignment processing may be performed such that the difference between the planned demand value and the actual demand value does not exceed the allowable threshold value.

The assignment management apparatus 400 may perform assignment processing in which the first facility and the second facility are targets such that a difference between a planned value of procurement power (namely, the planned procurement value described above) that is a difference between flow power and reverse flow power and an actual value of the procurement power (namely, the actual procurement value described above) is equal to or less than an allowable threshold value. In this way, the assignment processing may be performed such that the difference between the planned procurement value and the actual procurement value does not exceed the allowable threshold value.

According to the configuration described above, a penalty to be imposed on the entity that manages the first facility or the second facility can be reduced. However, the assignment management apparatus 400 may perform the assignment processing of divided computation processing to the computing device 240 even when the difference between the actual value and the planned value exceeds the allowable threshold value, in a case where an incentive caused by the assignment processing of the divided computation processing to the computing device 240 is larger than the penalty described above.

Modification Example 5

Modification Example 5 of the embodiment will be described below. In the following, differences from the embodiment will be mainly described.

In Modification Example 5, the assignment management apparatus 400 may identify, for each of the two or more facilities 200, total computation capacity that can be processed by the computing device 240 based on the prediction value of the power consumption of the facility 200 and the prediction value of the output power of the distributed power supply 210 for each unit time (for example, 30 minutes). The assignment management apparatus 400 may perform the assignment processing such that completion timing of the predetermined computation processing becomes early based on the total computation capacity.

For example, the assignment management apparatus 400 predicts so-called surplus power for each unit time from a difference between the prediction value of the power consumption of the facility 200 and the prediction value of the output power of the distributed power supply 210 per unit time for each of the three facilities 200. Then, in a case where the surplus power generated in each facility 200 is assumed to be used for processing for each unit time in the computing device 240 placed in each facility, a total of computation processing amounts for each unit time to be calculated for each facility is a total computation capacity that can be processed for each unit time. In order to determine the computation processing amounts for each unit time to be calculated for each facility, the assignment management apparatus 400 may store the processing capacity of the computing device 240 of each facility. The processing capacity may be stored in association with a computation processing amount for each electrical power. The associating of the computation processing amount for each electrical power may be performed such that the larger the electrical power is, the larger the computation processing amount is.

Here, the total computation capacity may be affected by a magnitude of electrical power being available in the computing device 240 for each unit time. In other words, when the electrical power being available in the computing device 240 is large, the total computation capacity may increase, and when the electrical power being available in the computing device 240 is small, the total computation capacity may decrease. At least when the electrical power being available in the computing device 240 is zero, the total computation capacity is also zero. The total computation capacity may be affected by the processing capacity of the computing device 240.

For example, a case is considered in which after assignment processing of divided computation processing to the computing device 240 is performed, reassignment processing of divided computation processing is not performed. In such a case, it is conceivable that the total computation capacity for n+1-th unit time is larger than the total computation capacity for n-th unit time, and completion timing of the predetermined computation processing when the predetermined computation processing is started in the n+1-th unit time is earlier than that when the predetermined computation processing is started in the n-th unit time. In such a case, the assignment management apparatus 400 performs assignment processing of divided computation processing to the computing device 240 based on the n+1-th unit time, rather than the n-th unit time. As the assignment processing, one or more types of assignment processing selected from among the first assignment processing to the fourth assignment processing described above can be used.

For example, a case is considered in which reassignment processing of divided computation processing is performed after performing assignment processing of divided computation processing to the computing device 240. In such a case, it is conceivable that the total computation capacity for the n+1-th unit time is larger than the total computation capacity for the n-th unit time. The assignment management apparatus 400 may perform the assignment processing of divided computation processing to the computing device 240 based on the n-th unit time, and perform the reassignment processing of divided computation processing to the computing device 240 based on the n+1-th unit time. Here, the reassignment processing may include processing for adding a new computing device 240 to the computing device 240 assigned with divided computation processing in the n-th unit time, and may include processing for replacing the computing device 240 assigned with divided computation processing in the n-th unit time with a new computing device 240.

Modification Example 6

Modification Example 6 of the embodiment will be described below. In the following, differences from the embodiment will be mainly described.

In Modification Example 6, the assignment management apparatus 400 may transmit, to the facility 200, a message including an information element specifying a type of divided computation processing to be assigned to the computing device 240. The type of divided computation processing includes at least one of the first computation processing and the second computation processing.

In such a case, the facility 200 may determine whether or not to accept the execution of divided computation processing based on a compensation corresponding to the type of divided computation processing to be assigned to the computing device 240. For example, the facility 200 may determine to accept the execution of the divided computation processing when the compensation corresponding to the type of the divided computation processing is higher than a predetermined threshold value, and may determine not to accept the execution of the divided computation processing when the compensation corresponding to the type of divided computation processing is lower than the predetermined threshold value. The predetermined threshold value may be determined based on a cost of the electrical power to be required for the divided computation processing.

The facility 200 may transmit, to the assignment management apparatus 400, a message including an information element indicating whether or not to accept the execution of the divided computation processing. The assignment management apparatus 400 may re-execute the assignment processing when receiving a message including an information element indicating that the execution of the divided computation processing is not accepted.

In such a case, the computing device 240 may receive a message including the information element specifying the type of divided computation processing, and may determine whether or not to accept the divided computation processing. A device other than the computing device 240 included in the facility 200 may receive a message including the information element specifying the type of divided computation processing, and may determine whether or not to accept the divided computation processing.

Modification Example 7

Modification Example 7 of the embodiment will be described below. In the following, differences from the embodiment will be mainly described.

In Modification Example 7, the assignment management apparatus 400 may perform assignment processing based on a comparison result between a compensation corresponding to the type of corresponding computation processing and a compensation corresponding to the type of power source. As described above, the type of corresponding computation processing includes at least one of the first computation processing and the second computation processing. The compensation corresponding to the type of power source is a cost of the electrical power to be required for divided computation processing. The cost of the electrical power to be required for the divided computation processing may be the power selling price of the surplus power or may be the power purchasing price of the system power.

Specifically, the assignment management apparatus 400 performs assignment processing to the computing device 240 where the compensation corresponding to the type of corresponding computation processing is higher than the compensation corresponding to the type of power source, without performing the assignment processing to the computing device 240 where the compensation corresponding to the type of corresponding computation processing is lower than the compensation corresponding to the type of power source. According to such a configuration, it is possible to reduce disadvantages of the facility 200 caused by the assignment of divided computation processing.

Other Embodiments

Although the present disclosure has been described by the above-described embodiment, it should be understood that the description and the drawings which form a part of this disclosure do not limit this disclosure. Various alternative embodiments, examples, and operational techniques will be apparent from this disclosure to those skilled in the art.

Although not particularly described in the embodiment, the computing device 240 (distributed computing device) is placed in the facility 200. The computing device 240 placed in the facility 200 may include the computing device 240 placed within the facility 200 and may include the computing device 240 placed outside the facility 200.

Although not particularly described in the embodiment, the assignment management apparatus 400 may perform the assignment processing such that demand power (flow power) to be supplied from the power system 20 to the facility 200 does not exceed a threshold value in the unit time (for example, 30 minutes). The demand power for the unit time may be referred to as a demand value. The control for monitoring the demand power such that the demand power does not exceed a threshold value in the unit time may be referred to as demand monitoring. Alternatively, the control for suppressing the demand power such that the demand power does not exceed the threshold value in the unit time may be referred to as peak cut control.

In the embodiment, the solar cell device has been exemplified as the distributed power supply 210 that utilizes renewable energy to output electrical power. However, the embodiment is not limited to this example. The distributed power supply 210 that utilizes the renewable energy to output the electrical power may include a wind power generation device, may include a hydraulic power generation device, may include a biomass power generation device, and may include a geothermal power generation device.

In the embodiment, the prediction value of the power consumption of the facility 200 is used, but the embodiment is not limited thereto. In place of the prediction value of the power consumption of the facility 200, the prediction value of the demand power of the facility 200 may be used. The demand power of the facility 200 is a difference between the power consumption of the facility 200 and the output power of the distributed power supply 210. In other words, when the difference between the output power of the distributed power supply 210 and the power consumption of the facility 200 is a negative value, it may be considered such a difference is referred to as the demand power (or flow power). When the difference between the output power of the distributed power supply 210 and the power consumption of the facility 200 is a positive value, it may be considered such a difference is referred to as the surplus power (or reverse flow power).

In the embodiment, all of the facilities 200 have the distributed power supply 210, but the embodiment is not limited thereto. There may be the facility 200 that does not have the distributed power supply 210.

Although not particularly described in the embodiment, the output power (hereinafter, referred to as green power) of the distributed power supply 210 that utilizes renewable energy to output electrical power and that is placed in the facility 200 may be used only for the computing device 240 or may be primarily used for the computing device 240. Furthermore, the power storage device is placed in the facility 200, the remaining green power after being used by the computing device 240 is charged in the power storage device, and an amount of electrical power that is insufficient to perform the computation processing may be discharged from the power storage device when the green power supplied from the distributed power supply 210 is lower than the electrical power to be used in the computing device 240. When the green power is used only for the computing device 240, the power storage device may charge only green power, and the green power can be efficiently used only for the computing device 240. When the green power is primarily used for the computing device 240, the green power or the output power of the power storage device may be used in a load device other than the computing device 240 under a predetermined condition. The predetermined condition may be a case in which the facility 200 is in a state of power outage. The predetermined condition may be a case where the power purchasing price of the system power is higher than the predetermined threshold value. Instead of using the green power for the load device, for example, when the power purchasing price of the system power is lower than the predetermined threshold value, the output power of the system power may be used for the computing device 240 or may be charged in the power storage device. It is sufficient that the output power of the system power or the amount of electrical power to be charged in the power storage device is less than or equal to the amount of green power used in the load device.

Although not particularly described in the embodiment, an apparatus (control) that determines the executability of the computation processing by the computing device 240 is not limited to the assignment management apparatus 400, and may be the computing device 240 or other external devices. Furthermore, the apparatus that determines the executability of the computation processing by the computing device 240 may vary depending on the type of power source or the type of corresponding computation processing. For example, the determination of the executability by the computing device 240 using only the system power may be performed by the computing device 240, and the determination of the executability by the computing device 240 using the distributed power supply 210 may be performed by the external device. Based on the determination result of each device, the assignment management apparatus 400 may receive a message including an information element indicating the executability of the computation processing by the computing device 240.

In the embodiment, one assignment management apparatus 400 is used, but the embodiment is not limited thereto. In addition to the case of one assignment management apparatus 400, a plurality of assignment management apparatuses 400 may be used. For example, there may be the assignment management apparatus 400 that assigns divided computation processing to the computing device 240 of the facility 200 having the distributed power supply 210, and the assignment management apparatus 400 that assigns divided computation processing to the computing device 240 of the facility 200 not having the distributed power supply 210. For example, the assignment processing is constituted by a first step of determining whether or not the computation processing can be performed by the computing devices 240 based on various information elements, and a second step of determining which computing devices 240 are to be assigned with pieces of divided computation processing from among the computing devices 240 determined to be capable of performing the computation processing. Thus, there may be the assignment management apparatus 400 that performs the first step and the assignment management apparatus 400 that performs the second step.

In the embodiment, the assignment management apparatus 400 receives the assignment-related message from the facility 200, but the embodiment is not limited thereto. The assignment-related message may be received from the facility 200 via the power management apparatus 300 or an external device, and in this case, the assignment-related message can be considered to be received from the facility 200.

In the embodiment, the name of the power management system is used, but the embodiment is not limited thereto. The power management system may be replaced with a distributed processing system. Similarly, the power management method may be replaced with a distributed processing method.

Although not specifically mentioned in the embodiment, the electrical power may be instantaneous power (kW) or may be an integrated power amount (kWh) in a certain period (for example, 30 minutes). For example, the planned value and the actual value may be represented by using an integrated power amount (kWh).

The invention claimed is:

1. A power management system, comprising:
a management apparatus configured to assign one of pieces of divided computation processing constituting at least a part of predetermined computation processing to a distributed computing device placed in a facility, the pieces of the divided computation processing corresponding to different processing loads, wherein
the management apparatus comprises
a communication module configured to receive a message comprising an information element indicating a type of a power source configured to identify electrical power allowed as electrical power to be used by the distributed computing device; and
a processor configured to perform assignment processing to assign the one of the pieces of the divided computation processing to the distributed computing device based on the type of the power source, the type of the power source including at least one of surplus power of the facility, output power of a distributed power supply placed in the facility, or system power to be supplied from a power system connected to the facility,
the processor is configured to change a method of assigning the one of the pieces of the divided computation processing based on whether the power source is the surplus power, the output power or the system power, and
the communication module is configured to transmit an assignment instruction including an assignment result of the assignment processing to control the distributed computing device to perform the one of the pieces of the divided computation processing by using the electrical power provided by the power source.

2. The power management system according to claim 1, wherein
the power source is the surplus power of the facility, and
the processor is configured to perform the assignment processing based on a power selling price of the surplus power.

3. The power management system according to claim 1, wherein
the power source is the output power of the distributed power supply, and the processor is configured to perform the assignment processing based on a prediction value of the output power of the distributed power supply.

4. The power management system according to claim 1, wherein
the power source is the output power of the distributed power supply which is a power storage device, and
the processor is configured to perform the assignment processing based on a residual amount of electricity of the power storage device.

5. The power management system according to claim 1, wherein
the power source is the system power, and
the processor is configured to perform the assignment processing based on a power purchasing price of the system power.

6. The power management system according to claim 1, wherein
the power source is the system power, and
the processor is configured to perform the assignment processing in such a manner that demand power to be supplied to the facility from the power system connected to the facility does not exceed a threshold value in a unit time.

7. The power management system according to claim 1, wherein
the information element is configured in such a manner that two or more types of power sources are capable of being specified as the type of the power source.

8. The power management system according to claim 7, wherein
the processor is configured to
identify a power source to be used by the distributed computing device from among the two or more power sources based on a power selling price of the surplus power and a power purchasing price of the system power, and
perform the assignment processing based on the identified power source.

9. The power management system according to claim 1, wherein
the processor is configured to
perform the assignment processing for two or more distributed computing devices individually placed in two or more facilities, and
perform the assignment processing in such a manner that one of the two or more distributed computing devices for which an identified power source is allowed as the power source satisfies a predetermined condition.

10. The power management system according to claim 9, wherein
the predetermined condition comprises at least one of
a condition where the number of the two or more distributed computing devices each of which is configured to use, as the power source, output power of a distributed power supply configured to use renewable energy and to output electrical power, is equal to or larger than a certain number,
a condition where a ratio of the number of green computing devices each of which is a computing device configured to use, as the power source, output power of a distributed power supply configured to use renewable energy and to output electrical power, with respect to a total number of the the two or more distributed computing devices, is equal to or larger than a certain ratio,
a condition where power consumption of the green computing devices each of which is a computing device configured to use, as the power source, output power of a distributed power supply configured to use renewable energy and to output electrical power, is equal to or larger than a certain amount, or
a condition where a ratio of the power consumption of the green computing devices each of which is a computing device configured to use, as the power source, output power of a distributed power supply configured to use renewable energy and to output electrical power, with respect to a total power consumption of the two or more distributed computing devices each of which processes the predetermined computation processing, is equal to or larger than a certain ratio.

11. The power management system according to claim 1, wherein
the processor is configured to perform the assignment processing based on a request level of the predetermined computation processing.

12. A power management method to be used in a power management system, the power management system comprising a management apparatus configured to assign one of pieces of divided computation processing constituting at least a part of predetermined computation processing to a distributed computing device placed in a facility, the pieces of divided processing corresponding to different processing loads, the power management method comprising:
receiving, by the management apparatus, a message comprising an information element indicating a type of a power source configured to identify electrical power allowed as electrical power to be used by the distributed computing device; and
performing, by the management apparatus, assignment processing to assign one of the pieces of the divided computation processing to the distributed computing device based on the type of the power source, the type of the power source including at least one of surplus power of the facility, output power of a distributed power supply placed in the facility, or system power to be supplied from a power system connected to the facility,
wherein
the method further comprises
changing a method of assigning the one of the pieces of the divided computation processing based on whether the power source is the surplus power, the output power or the system power, and
transmitting an assignment instruction including an assignment result of the assignment processing to control the distributed computing device to perform the one of the pieces of the divided computation processing by using the electrical power provided by the power source.

13. The power management system according to claim 9, wherein
the predetermined condition includes a condition where the number of the two or more distributed computing devices each of which is configured to use, as the power source, output power of a distributed power supply configured to use renewable energy and to output electrical power, is equal to or larger than a certain number.

14. The power management system according to claim 9, wherein the predetermined condition includes a condition where a ratio of the number of green computing devices each of which is a computing device configured to use, as the power source, output power of a distributed power supply configured to use renewable energy and to output electrical power, with respect to a total number of the two or more distributed computing devices, is equal to or larger than a certain ratio.

15. The power management system according to claim 9, wherein
the predetermined condition includes a condition where power consumption of green computing devices each of which is a computing device configured to use, as the power source, output power of a distributed power supply configured to use renewable energy and to output electrical power, is equal to or larger than a certain amount.

16. The power management system according to claim 9, wherein
the predetermined condition includes a condition where a ratio of the power consumption of the green computing devices each of which is a computing device configured to use, as the power source, output power of a distributed power supply configured to use renewable energy and to output electrical power, with respect to a total power consumption of the two or more distributed computing devices each of which processes the predetermined computation processing, is equal to or larger than a certain ratio.

17. The power management system according to claim 1, wherein
the processor is configured to perform the assignment processing for two or more distributed computing devices individually placed in two or more facilities based on the type of the power source, and
the communication module is configured to transmit assignment instructions each including an assignment result of the assignment processing for a corresponding distributed computing device to control the corresponding distributed computing device to perform the one of the pieces of the divided computation processing by using the electrical power provided by the power source such that each distributed computer device among the two or more distributed computing devices individually placed in the two or more facilities performs a piece of the pieces of the divided computation processing corresponding to a processing load of the processing loads.

18. The power management method according to claim 12, further comprising:
performing the assignment processing for two or more distributed computing devices individually placed in two or more facilities based on the type of the power source; and
transmitting assignment instructions each including an assignment result of the assignment processing for a corresponding distributed computing device to control the corresponding distributed computing device to perform the one of the pieces of the divided computation processing by using the electrical power provided by the power source such that each distributed computer device among the two or more distributed computing devices individually placed in the two or more facilities performs a piece of the pieces of divided computation processing corresponding to a processing load of the processing loads.

* * * * *